June 4, 1968 B. L. PITTS ET AL 3,386,136
DRAFTING SYSTEM
Filed Feb. 3, 1965 6 Sheets-Sheet 1
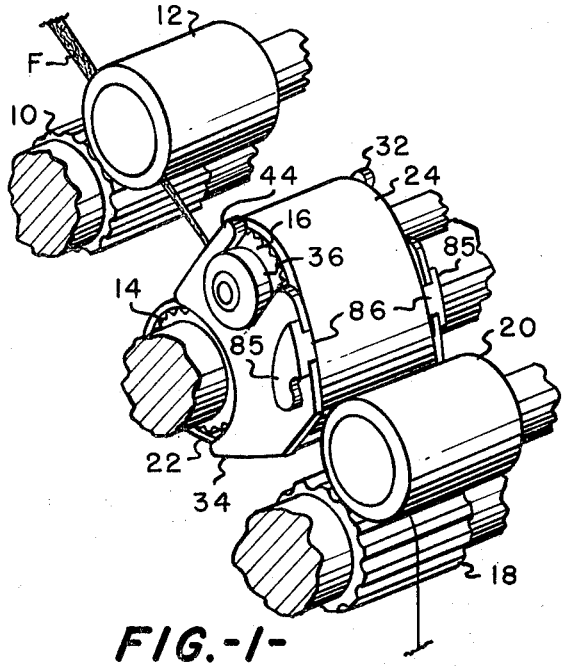
FIG.-1-
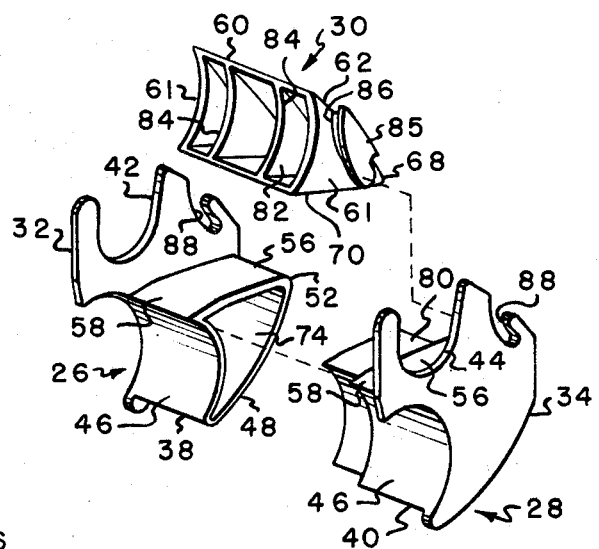
FIG.-3-
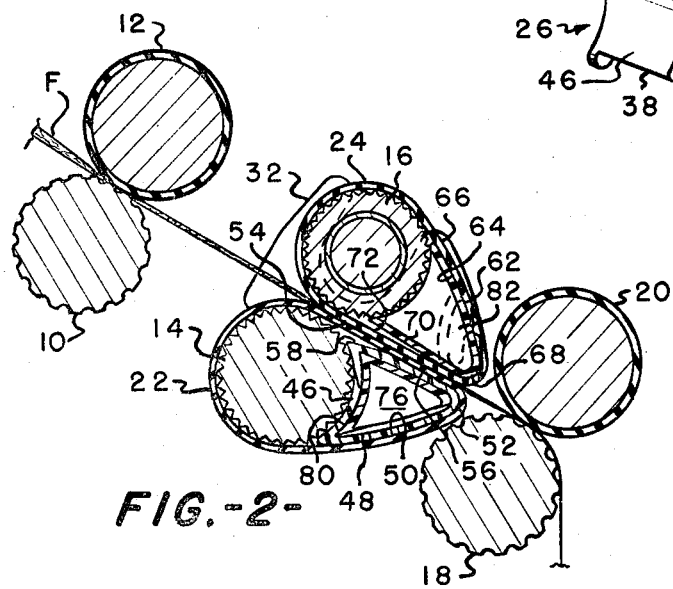
FIG.-2-
INVENTORS
BOBBY L. PITTS
ROBERT M. INGHAM, JR.
BY
Earle R. Marden
ATTORNEY

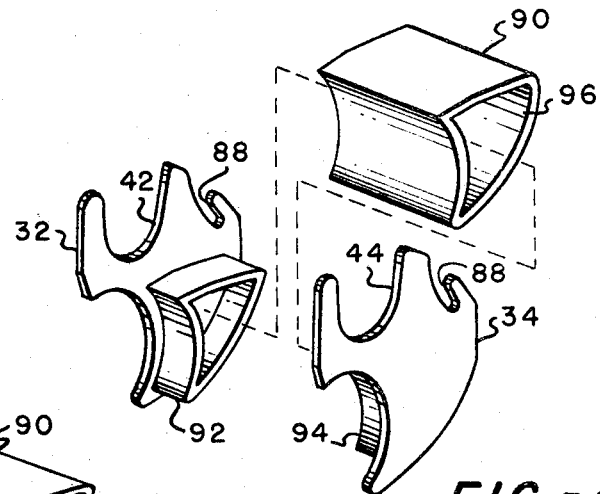
FIG.-4-
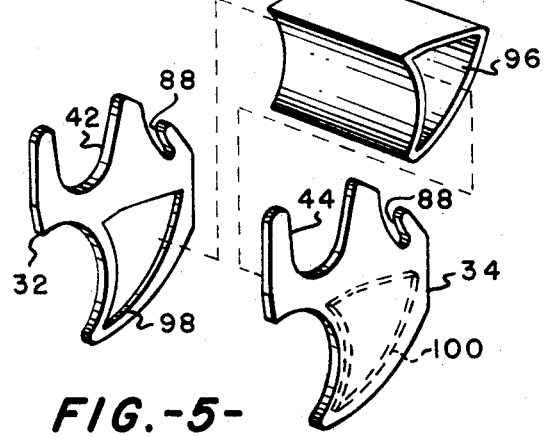
FIG.-5-
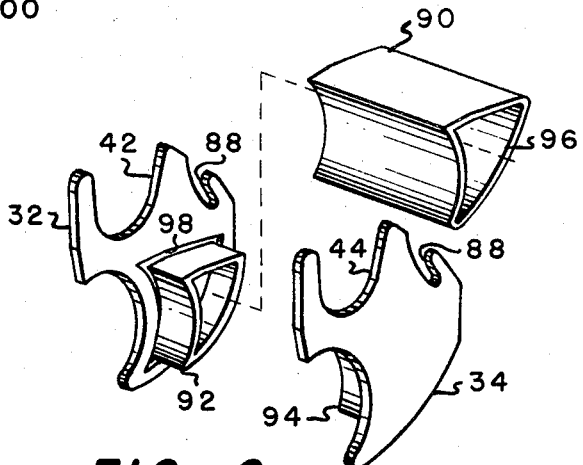
FIG.-6-

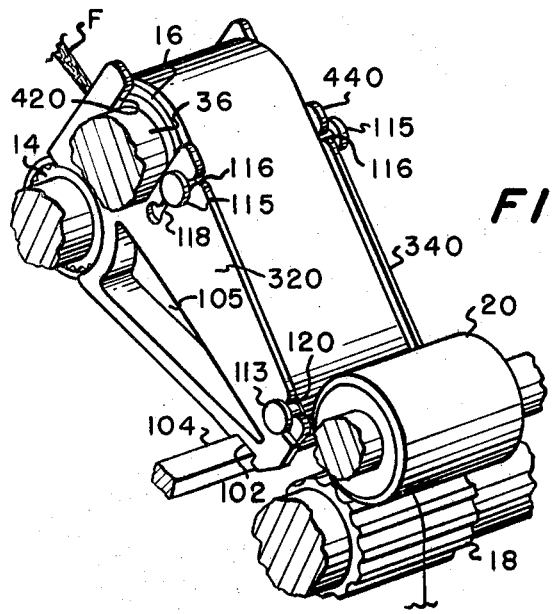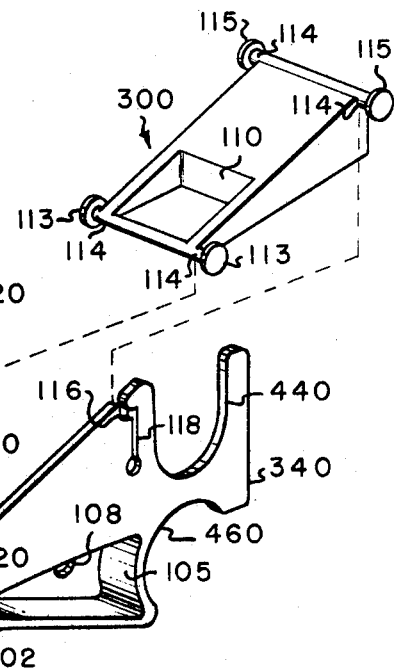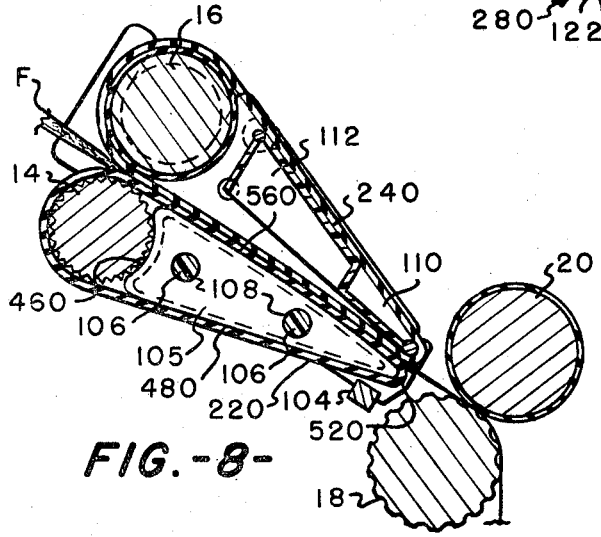

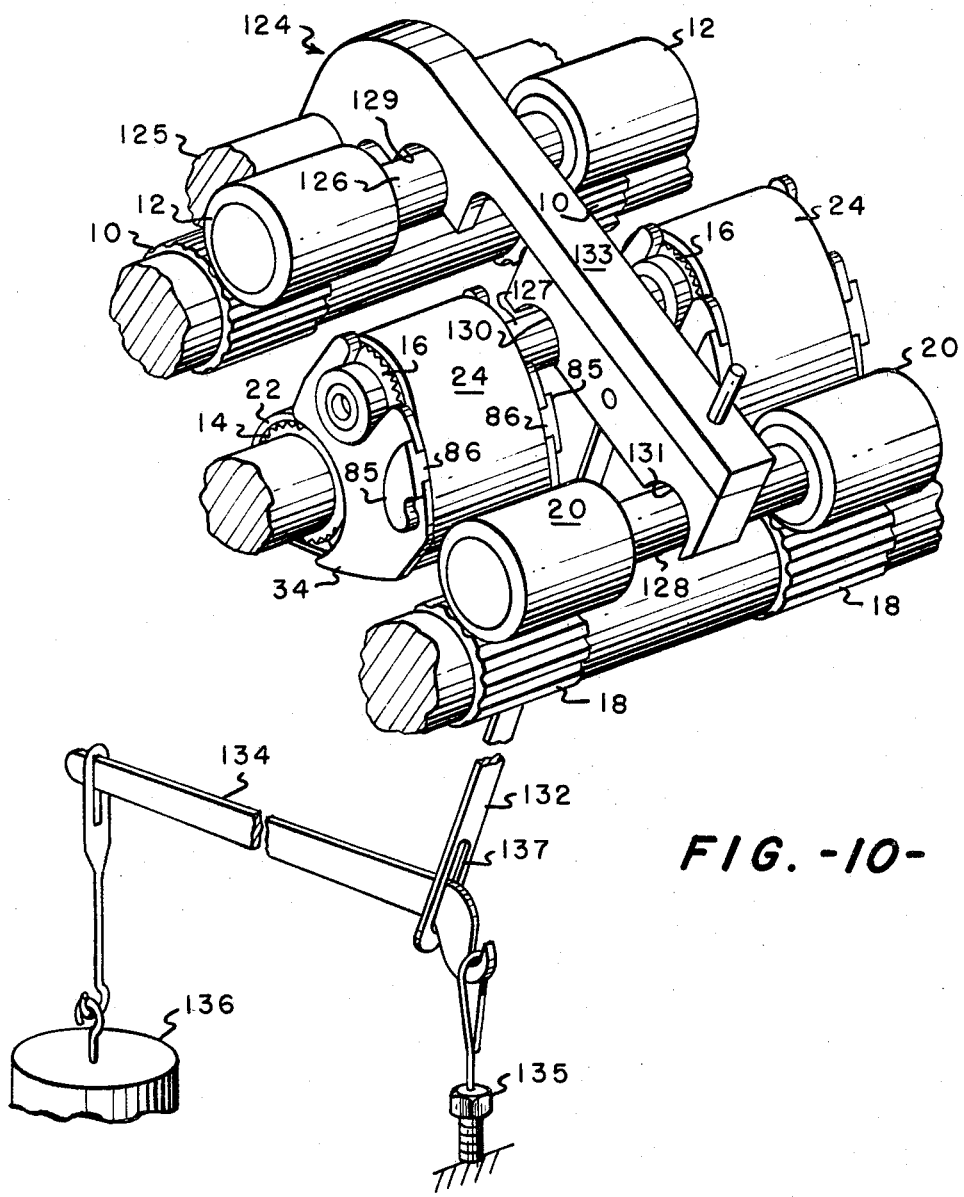
FIG.-10-

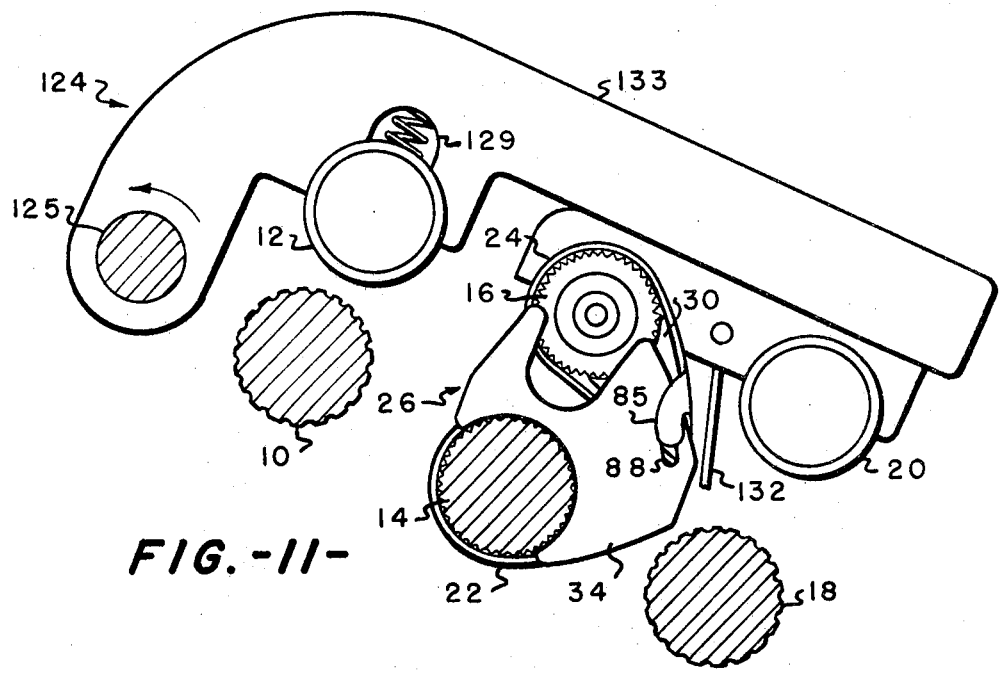
FIG.-11-
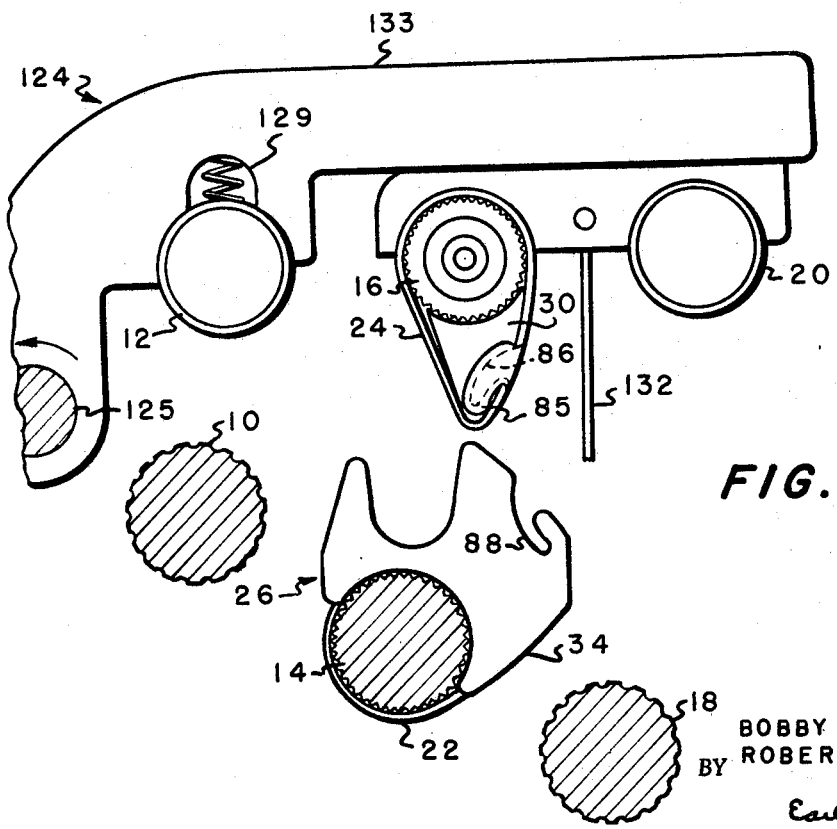
FIG.-12-
INVENTOR.
BOBBY L. PITTS
ROBERT M. INGHAM, JR.
BY
Earle R. Marden
ATTORNEY

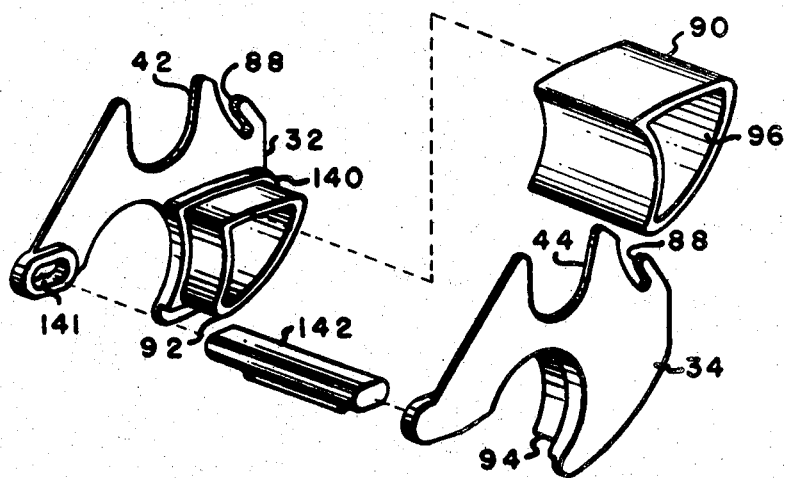
FIG. -13-

United States Patent Office 3,386,136
Patented June 4, 1968

3,386,136
DRAFTING SYSTEM
Bobby L. Pitts and Robert M. Ingham, Jr., Spartanburg, S.C., assignors to Deering Milliken Research Corporation, Spartanburg, S.C., a corporation of Delaware
Continuation-in-part of abandoned application Ser. No. 390,272, Aug. 14, 1964, which is a continuation-in-part of abandoned application Ser. No. 366,023, May 8, 1964. This application Feb. 3, 1965, Ser. No. 432,069
11 Claims. (Cl. 19—245)

This application is a continuation-in-part of our application, Ser. No. 390,272, filed Aug. 14, 1964 and now abandoned, which in turn was a continuation-in-part of our application, Ser. No. 366,023, filed May 8, 1964, now abandoned.

This invention relates to textile handling apparatus and more particularly to a textile drafting arrangement which provides for apron guiding and roll apron cleaning and which is particularly adapted for manufacture by molding.

It has been found most advantageous in an apron type drafting arrangement to provide guiding and cleaning elements for the aprons, which elements also serve to clean the apron carrying roll surface. Such cleaning and guiding elements, including cradles integrally incorporating such cleaning and guiding elements, are advantageously formed with converging apron guiding surfaces which may terminate at the small end in a reduced diameter nose, and at the opposite larger end having a concave surface of a radius of curvature which conforms to the radius of curvature of the apron carrying roll. The apron exerts a compressive force on the cleaning and guiding element at the nose end and the force is transmitted to the larger end to aid in positioning the cleaning and guiding element within the confines of the apron. In providing for molding of these tapered cleaning and guiding elements it is necessary to provide for ease of mold release and to minimize the likelihood for warpage and provide satisfactory strength of the molded piece. It is further necessary to provide a structure which is readily assembled on and disassembled from a drawing, roving, spinning frame or the like with a minimum of effort and at the same time provides maximum apron cleaning and support.

It is therefore an object of this invention to provide molded apron guiding and roll and apron cleaning elements which are easily molded with a minimum of warpage.

Another object of the invention is to provide an apron guiding and roll and apron cleaning element which has a minimum number of parts and is therefore easier and relatively inexpensive to manufacture.

A still further object of the invention is to provide an apron guiding and roll and apron cleaning element which is supported on the rolls to reduce the possibility of apron breakage.

Another object of the invention is to provide an apron guiding and roll and apron cleaning element which is adapted to the drafting of various fiber lengths and various desired degrees of draft.

A fifth object of the invention is to provide an apron guiding and roll apron cleaning element which is readily placed into operative relation in a drafting system.

A still further object of the invention is to provide a drafting system which will efficiently handle the drafting of long staple fibers or a blend of short and long staple fibers.

Other objects and advantages of the invention will become apparent as the specification proceeds to describe the invention with reference to the accompanying drawings, in which:

FIG. 1 is a schematic view in perspective of a drafting arrangement incorporating the herein disclosed invention;

FIGURE 2 is a sectional view of the drafting arrangement shown in FIGURE 1;

FIGURE 3 is in an exploded perspective view of the novel apron guiding and roll and apron cleaning element shown in FIGURES 1 and 2;

FIGURES 4–6 are exploded perspective views of modifications of the element shown in FIGURE 3;

FIGURE 7 is a view similar to FIGURE 1 and is a schematic view in perspective of a drafting arrangement designed to draft long staple fibers;

FIGURE 8 is a cross-sectional view of the drafting arrangement shown in FIGURE 7;

FIGURE 9 is an exploded perspective view of the apron guiding and roll and apron cleaning element shown in FIGURES 7 and 8;

FIGURE 10 is a perspective view of the drafting arrangement of FIGURES 1–6 employing a pendulum weight arm;

FIGURE 11 is a partial sectional view of FIGURE 10 as the pendulum weight arm is being lifted;

FIGURE 12 is a partial sectional view of FIGURE 10 showing the pendulum weight arm raised to a position where the apron guiding and cradle connecting member has cleared the lower cradle and clearer members; and FIGURE 13 is a further modification of the elements shown in FIGURES 3–6.

Referring now in detail to the figures of the drawings, an illustrative preferred embodiment is shown in FIGURES 1–3, in which a running mass of staple fibers F is passed in conventional manner successively between pairs of drafting rolls 10 and 12, 14 and 16 and 18 and 20, the middle pair of rolls 14 and 16 having a pair of endless fiber control aprons 22 and 24, respectively.

Inasmuch as the major amount of drafting is conventionally accomplished in the zone between the middle rolls 14, 16 and the front rolls 18, 20 from which the fibers proceed and are either twisted into yarn or drafted further, and since the running mass of fibers is also brought to a minimum size in the zone between the middle and front pairs of rolls, it is most desirable that the fibers be controlled as closely as possible in this zone. The present invention facilitates this control by the aprons while also enabling the ease of molding of the apron controlling and cleaning element.

Looking now to FIGURES 1–3 and more particularly to FIGURE 3 the preferred apron guiding and roll and apron cleaning element consists of three basic components, namely cradle and clearer member 26, cradle and clearer member 28 and apron guiding and cradle connecting member 30.

Various materials may be employed in the formation of the above-mentioned apron guiding and roll and apron cleaning element, including particularly those plastics which are readily moldable and which have good stability and wear characteristics, such as for instance, Delrin acetal resin, nylon and Bakelite.

In the preferred form of the invention both of the cradle and clearer members 26 and 28 include upstanding wall members 32 and 34, respectively, which frictionally engage the roll neck 36 of the top center roll 16 to position and support the apron guiding and roll and apron cleaning segments 38 and 40 and apron guiding element 30 within the respective aprons 22 and 24. If desired, elongated notches 42 and 44 in the wall members 32 and 34 can be slightly narrower in width than the diameter of the roll neck 36 to provide a tight frictional contact between the roll neck 36 and the cradle and clearer members 26 and 28 to properly position the segments 38 and 40 and the apron guiding element 30 within the aprons 22 and 24, respectively.

The apron guiding and roll and apron cleaning segments 38 and 40 are secured together in a manner hereinafter described to provide a concave surface roll engaging surface 46 with a radius of curvature substantially equal to the radius of curvature of the external diameter of the roll 14 and is in peripheral engagement therewith. The interconnected segments 38 and 40 also provide an apron cleaning and guiding surface 48 which supports run 50 of the apron 22 and cleans the inner surface thereof due to the rubbing action of the apron on the surface. Apron cleaning and guiding surface 48 extends between the concave surface 46 and the nose portion 52 about which the apron reverses direction and is tensioned thereby. Nose portion 52 has a radius of curvature substantially less than that of the concave roll engaging surface 46. Extending between the nose portion 52 and the concave surface 46 adjacent the fiber engaging surface 54 of the apron 22 is a surface 56 which engages the apron 22 adjacent the nose portion 52 but is inclined away at 58 from the apron adjacent the concave roll engaging surface 46 in order to allow the drafting of various diameter fibers without adjusting the drafting area between the aprons 22 and 24 and to aid in feed-through of the fiber mass between this surface and the adjacent fiber control run of the apron 24.

Apron guiding and cradle connecting member 30 is similar in function to elements 38 and 40 in that it has surfaces 60 and 61 adjacent the top roll 16, an apron guiding and cleaning surface 62 in contact with the inner surface 64 of the run 66 of the apron 24 to guide run 66 and clean the inner surface of the apron, an apron reversing nose portion 68 to guide and tension the apron 24 and an apron supporting and cleaning surface 70 adjacent the fiber engaging run 72 of the apron 24. The apron supporting and cleaning surface 70 is slanted away from the fiber engaging run 72 in the direction from the nose portion 68 toward the top roll 16 in order to allow drafting of various diameter fibers without adjusting the drafting area between the aprons 22 and 24.

It should be noted (FIGURE 1) that the wall members 32 and 34 extend beyond the aprons 22 and 24 toward the front rolls, thereby confining the aprons in a prescribed path and preventing the abrasion and/or rupture of the aprons by engagement with one of the front rolls 18 or 20.

Looking now in particular to FIGURE 3 the specific construction and assembly of the apron guiding and roll and apron cleaning member is shown. As previously pointed out apron guiding and roll and apron cleaning segments 38 and 40, respectively, are molded to wall members 32 and 34. For purposes of molding and for reasons set forth hereinafter a cavity 74 is provided in segment 38 and a cavity 76 is provided in segment 40. Preferably the walls surrounding cavities 74 and 76 are of substantially equal thickness in order to provide uniform cooling in order to minimize warpage due to nonuniform cooling of the members. For purposes of assembly a projection 80 is molded to the segment 40 and conforms in shape to the cavity 74 in segment 38. The segments 38 and 40 are shown as being substantially equal in width but such is not necessary within the scope of the invention since it is obvious that such segments 38 and 40 could be of different widths and still be capable of interconnection. The only limitation on width is that the meeting point of the segments 38 and 40 be under the apron 22 in order to prevent lint from collecting at this point.

Apron guiding and connecting member 30 is also provided with a cavity 82. Integrally molded within cavity 82 is a plurality of reinforcing web members 84 to provide rigidity to the structure. Integrally molded to member 30 on each side thereof is a tab member 85. Connected between tab members 85 and wall members 61 is a molded connecting portion 86 which conforms in shape to the arcuate slots 88 in the wall members 32 and 34.

In normal textile drafting systems the top rolls 16 are either singular or are in pairs. Therefore, to assemble the herein described novel apron guiding and roll and apron cleaning member, the segments 38 and 40 are first located within the bottom apron 22 and snapped together with the projection 80 located within the confines of the cavity 74. Then the apron guiding and connecting member 30 with roll 16 and apron 24 thereon is so placed that the connecting portions 86 are located in the arcuate slots 88 with the tab members 85 lying outside the wall members 32 and 34. Then the apron guiding and connecting member 30 is rotated in the arcuate slots 88 until the roll necks 36 of the top roll 16 seat themselves in the notches 42 and 44 and the connecting portions 86 seat themselves in the bottom of the arcuate slots 88 with the tab members lying outside the wall members 32 and 34 to prevent separation of the segments 38 and 40 from one another due to vibration, etc.

In systems of this type the degree of drafting is controlled by the distance between the nose portions 52 and 68. Therefore, to provide for different degrees of drafting it is necessary only to mold different connecting portions 86 to the member 30 to control the position of the nose portion 68 with respect to the nose portion 52.

The modifications of FIGURES 4–6 are views similar to FIGURE 3 except the apron guiding and connecting member 30 is not shown since it will be the same as in FIGURE 3 for each of the modifications. In FIGURES 4–6 elements which are the same as in FIGURES 1–3 will be designated by the same reference number. The modifications of FIGURES 4–6 are modifications of the construction of the lower middle roll engaging member.

In the modification of FIGURE 4 the apron guiding and roll and apron cleaning element 90, equivalent to the segments 38 and 40 in FIGURES 1–3, is a molded unitary hollow member which is secured in position between the wall members 32 and 34 by hollow projections 92 and 94, respectively, molded to the wall members 32 and 34 and snugly fit into the cavity 96 in the member 90. Preferably hollow projections 92 and 94 are shaped to conform to the shape of cavity 96.

Looking now to FIGURE 5 the unitary hollow molded apron guiding and roll and apron cleaning member 90 is secured in recesses 98 and 100 formed on the interior of the wall members 32 and 34 which conform in shape and size to the outer dimensions of the member 90 in order to snugly accommodate such member. This form of the invention is particularly useful when the diameter of the roll neck of the lower roll 14 is less than the diameter of the apron carrying surface.

In the modification of FIGURE 6 the modifications of both FIGURES 4 and 5 are combined to provide projections 92 and 94 which snugly fit the interior of the cavity 96 and recesses 98 and 100 which snugly receive the exterior dimensions of the member 90 in order to firmly secure the member 90 in the desired position withing the apron 22. In all modifications of FIGURES 4–6, the apron guiding and connecting member secures the wall members 32 and 34 and the member 90 in connected relationship and prevents accidental separation due to vibration, etc.

The embodiments of FIGURES 1–6 are not limited to the drafting of any particular length fibres but it is preferred to employ such embodiments on the shorter length staple fibres and employ the embodiment of FIGURES 7–9 on the longer length stable fibres such as wool and synthetic or for drafting of a sliver or roving which is a blend of long and short fibres. For the sake of illustration only the middle and front rolls have been shown. In actual operation it is also very conceivable that the back rolls 10 and 12 can be eliminated by the use of the herein disclosed novel apron guiding and roll and apron cleaning element. The construction of the element of FIGURES 7–9 is very similar to that shown in FIGURES 1–3.

As in the preferred embodiment of FIGURES 1–3 the novel apron guiding and roll and apron cleaning element consists basically of three components, namely cradle and clearer member 260, cradle and clearer member 280, and apron guiding and connecting member 300. These elements when interconnected to one another provide the same function as their corresponding elements in FIGURES 1–3 and thusly the operation of same will not be repeated.

The cradle and clearer members 260 and 280 include upstanding wall members 320 and 340 which have notches 420 and 440 therein which frictionally engage the roll neck 36 of the roll 16 to position and support the apron guiding and roll apron cleaning elements in operative position. If desired, a notch 102 may be provided in the front end of the wall members 320 and 340 to engage a rod support member 104 to provide further support for the apron guiding and roll and apron cleaning element in order to relieve the stress on the wall members 320 and 340 due to the length and weight of the elongated element.

Integrally molded to the wall members 320 and 340 are apron guiding and roll and apron cleaning segments 380 and 400, respectively. As in the embodiments of FIGURES 1–6, each of these segments have apron supporting surfaces 480 and 560 with a nose portion 520 at one end and a concave roll engaging surface 460 at the other end. Each of these segments are provided with a cavity 105 for the sake of molding. To secure segments 380 and 400 together a plurality of pegs 106 are molded integral with one segment such as 380 and matching holes 108 are drilled or formed during molding in the other segment to accommodate the pegs 106 and secure the segments 260 and 280 together with surfaces 107 flush with one another underneath the apron 220. It is within the scope of the invention to provide pegs on both segments and complementary holes on the other segments to accommodate same.

Apron guiding and connecting member 300 is provided with cavities 110 and 112 to facilitate molding and minimize warping. Molded to the front and rear of member 300 are tab members 113 and 115 integrally connected to member 300 by stub shafts 114.

To assemble the apron guiding and roll and apron cleaning element of this modification, the cradle and clearer elements are positioned so that the segments 380 and 400 are located within the confines of the apron 220 and snapped together with the pegs 106 projecting through the holes 108. As in the other modification the top roll, apron 240, and apron guiding and connecting member 300 are interconnected before assembly. Then the top roll 16 is placed in the notches 420 and 440 and the stub shafts 114 connected to the tabs 115 are placed in the notches 116 in the wall members 320 and 340. Elongated slots 118 are also provided in wall members 320 and 340 to provide resiliency so that stub shafts can be snapped into position with the tabs 115 lying outside the wall members 320 and 340 to hold the segments 380 and 400 into interlocking relationship. Then the top roll 16, apron 240 and member 300 assembly is rotated until stub shafts 114 connected to tabs 113 are securely positioned in notches 120 in wall members 320 and 340. Again, slots 122 are provided to resiliently secure the stub shafts 114 in proper position. The apron and connecting member 300 is then positioned in a preselected relationship to the apron guiding and roll and apron cleaning segments 380 and 400 and the tabs 113 and 115 prevent accidental separation of segments 380 and 400 due to vibration, etc. To change the above-mentioned preselected relationship it is only necessary to provide various apron guiding and connecting members 300 which have different locations of the stub shafts 114 on the apron guiding and collecting member 300.

Looking now to FIGURES 10–12 the apron guiding and roll and apron cleaning elements of the embodiments of FIGURES 1–6 are shown employed in conjunction with a pendulum type roll hold-down and weight arm. In conventional drafting arrangements the bottom drafting rolls are integrally connected for a certain predetermined number of positions while the top rolls are normally in pairs in order to allow access to the aprons and bottom rolls. To provide the desired weight on the top rolls it is conventional to pivotally mount a pendulum type roll hold-down and weight arm 124 between the sets of top rolls 12, 16 and 20.

Pendulum arm 124 is pivotally secured to rod member 125 rigidly mounted in a suitable manner to the spinning or roving frame. Secured to roll shafts 126, 127 and 128 are bearings (not shown) secured in notches 129, 130, 131, respectively, of the pendulum arm 124. As is convention practice, the pendulum arm is secured in operative position by the hold-down anchor 132 connected between an upper hold-down arm 133 and a weighting lever 134 which is anchored at one end as through a screw anchor 135 and is adjustably weighted at the opposite end by weight 136.

To separate the top drafting rolls and associated parts from the lower drafting rolls the weight 136 is disconnected from the weighting lever 134 and the weighting lever is then slid out of the slot 137 in the hold-down anchor 132. The pendulum arm is then ready to be pivoted counterclockwise away from the lower drafting rolls. In FIGURE 10 the pendulum arm is shown in operative position. In FIGURE 11, the pendulum arm has been disconnected from the hold-down mechanism and has been partially pivoted. In pivoting the pendulum arm the interconnected cradle and clearer members 26 and 28 must be pivoted counterclockwise away from the lower front roll 18 in order for the tab members 85 to slide out of the arcuate slots 88 in the wall members 32 and 34. Looking at FIGURE 11 it can be seen that top rolls 12, 16 and 20 have been pivoted away from the lower drafting rolls and the interconnected cradle and clearer members 26 and 28 have been rotated away from the lower front roll 18.

Looking now to FIGURE 12 the interconnected cradle and clearer members 26 and 28 are still rotated further counterclockwise until the molded connecting portion 86 and the tab members 85 will slidably clear the arcuate slots 88 so the pendulum arm can be pivoted toward the back of the frame to provide complete access. Since the bearings for shaft 127 are secured in notch 130 of the pendulum arm 124 aprons 24 will cause the apron guiding and cradle connecting member 30 to be rotated therewith.

To place the drafting system into operation again the pendulum arm is merely rotated clockwise toward the lower drafting rolls, the tabs 85 and molded connecting portion 86 guided into position in the slots 88, and the weighting mechanism reconnected. The herein disclosed construction provides a pendulum arm construction which operates efficiently and is readily assembled and disassembled when necessary.

FIGURE 13 is a modification of the apron guiding and roll cleaning element shown in FIGURES 3–6 and is a view similar to FIGURES 4–6 in that the apron guiding and connecting member 30 is not shown since it will be the same as that shown in FIGURE 3. As in FIGURES 4–6 the apron guiding and roll and apron cleaning element 90 is a molded unitary hollow member which is secured in position between the wall members 32 and 34 by hollow projection 92 and 94, respectively, molded to the wall members 32 and 34 and snugly fit into the cavity 96 and the member 90.

Molded between the walls 32 and 34 and the respective projections 92 and 94 is a further projection 140 the outside dimensions of which conform to the outside dimensions of the member 90 so that when member 90 is positioned with the projections 92 and 94 in the cavity 96 the member 90 and the projection 140 will provide a substantially continuous surface between the cradle walls 32 and 34 for the cleaning and guiding of the apron. It should be noted that the projections 92 and 94 and the projection 140 along with the member 90 form an apron guiding and cleaning element between the side walls 32 and 34. The sides of apron in this modification ride adjacent the cradle walls 32 and 34 so that the line of intersection between the projections 140 and the member 90 will be covered to prevent the entry and build-up of lint.

As in the modification of FIGURES 4–6 the width of the member 90 is determined by the width of the drafting rolls to which the cradle is to be attached. To conform to different width drafting rolls it is only necessary to mold a wider member 90 and a wider member 30 to coincide therewith.

At the rear of the cradle walls 32 and 34 there is provided an opening 141 to accommodate therein a roving shelf 142 to guide roving into the nip of the drafting rolls and between the aprons. This prevents the roving from falling down between the middle and back rolls, thereby preventing a lap up due to improper feed of the roving into the drafting system. Roving shelf 142, like member 90 is held into position by the locking action of member 30 on the cradle walls 32 and 34.

The herein disclosed invention provides an apron drafting system in which the apron and rolls are continuously cleaned and at the same time provides support for the apron in the actual area of the drafting zone. Furthermore, this invention provides a compact readily assembled apron guiding and roll and apron cleaning drafting system which has a minimum number of parts and is inexpensive to manufacture. Furthermore, the new apron guiding and roll and apron cleaning system is supported in a manner to alleviate the problem of breakage of aprons due to inadvertent contact with the front rolls. Also, the new and proved drafting system employs a novel apron cleaning and roll and apron cleaning element which prevents inadvertent separation of the individual components due to vibration, etc.

Although we have described in detail the preferred embodiments of our invention, we contemplate that many changes may be made without departing from the scope or spirit of our invention, and we desire to be limited only by the claims.

That which is claimed is:

1. A drafting cradle comprising: an apron guiding and cleaning element, said apron guiding and cleaning element having a concave surface, said apron guiding and cleaning element having two surfaces converging in a direction extending away from said concave surface and culminating in a convex nose portion, a first wall member operably associated with said apron guiding and cleaning element, a second wall member separate from said first wall member and operably associated with said apron guiding and cleaning element, said first and second wall members having notches therein, said apron guiding and cleaning element having at least two segments, one of said segments being partially hollow, the other of said segments having a portion thereof projecting into the hollow portion of said one segment, and an apron guiding and cradle connecting element having tab means thereon engaging, said notches in said first and second wall members to maintain said wall members and said apron guiding and cleaning segments in predetermined relationship to one another.

2. The structure of claim 1 wherein said tab means includes a plurality of pairs of tabs, one of said pairs of tabs engaging said wall members a predetermined distance from another of said pairs of tabs.

3. The structure of claim 1 wherein a roving shelf is removably connected between said wall members to provide a guide for roving to a pair of drafting rolls.

4. The structure of claim 1 wherein said segment of said apron guiding and cleaning element which is partially hollow is separate from said wall members, said segment of said apron guiding and cleaning element projecting into said hollow segment being connected to one of said wall members and said apron guiding and cleaning element further including a third segment connected to said other of said wall members and projecting into said partially hollow segment.

5. The structure of claim 4 wherein said one segment and said third segment are integral with said respective wall members.

6. The structure of claim 5 wherein said hollow portion of said other segment has a certain preselected configuration, said one segment and said third segment each having a portion of the surface thereof conforming to the pre-selected configuration of said hollow segment.

7. The structure of claim 6 wherein a roving shelf means is provided between said cradle wall members.

8. The structure of claim 7 wherein said roving shelf means is removably secured in said wall members.

9. The structure of claim 1 wherein one of said segments is molded to one of said wall members and the other of said segments is molded to the other of said wall members.

10. A drafting cradle comprising: an apron guiding and cleaning element, said apron guiding and cleaning element being hollow, a first wall member, a second wall member, said first wall member and said second wall member having a projection thereon directed towards one another and telescoping within said hollow apron guiding and cleaning element and an apron guiding and cradle connecting element, said apron guiding and cradle connecting element having means connected thereto interlocking said wall members to prevent said projections from separating from said hollow apron guiding and cleaning element during use thereof.

11. The structure of claim 10 wherein said projections on said wall members have a portion of the external surface thereof conforming to the internal configuration of said hollow apron guiding and cleaning element.

References Cited

UNITED STATES PATENTS

| 3,267,526 | 8/1966 | Pippin et al. | 19—245 |
| 2,536,884 | 1/1951 | Noguera | 19—253 |
| 2,677,858 | 5/1954 | Kuehn et al. | 19—254 |
| 2,696,026 | 12/1954 | Noguera | 19—255 |
| 3,129,467 | 4/1964 | Swanson | 19—255 |

FOREIGN PATENTS 1,351,168  12/1963  France.

DORSEY NEWTON, *Primary Examiner.*

UNITED STATES PATENT OFFICE
CERTIFICATE OF CORRECTION

Patent No. 3,386,136                                               June 4, 1968

Bobby L. Pitts et al.

It is hereby certified that error appears in the above numbered patent requiring correction and that the said Letters Patent should read as corrected below.

Column 1, lines 18 and 61, "roll apron", each occurrence, should read -- roll and apron --; line 58, "adapted" should read -- adaptable --. Column 4, line 55, "ing the apron 22. In all modifications" should read -- in the apron 22. In all the modifications --; line 65, "for drafting" should read -- for the drafting --. Column 5, line 12, "roll apron cleaning elements" should read -- roll and apron cleaning element --; line 35, "segments", second occurrence, should read -- segment --; line 62, "apron and" should read -- apron guiding and --. Column 6, line 5, "and bottom" should read -- and the bottom --. Column 7, line 22, "and rolls" should read -- and the rolls --; line 57, after "engaging" cancel the comma.

Signed and sealed this 21st day of October 1969.

(SEAL)
Attest:

EDWARD M. FLETCHER, JR.                       WILLIAM E. SCHUYLER, JR.
Attesting Officer                                  Commissioner of Patents